United States Patent
Kaukl

(10) Patent No.: US 9,426,027 B1
(45) Date of Patent: Aug. 23, 2016

(54) REQUEST RESPONSE TRANSMUTATION PIPELINE

(71) Applicant: Amazon Technologies, Inc., Reno, NV (US)

(72) Inventor: Christopher Vincent Kaukl, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 384 days.

(21) Appl. No.: 14/183,382

(22) Filed: Feb. 18, 2014

(51) Int. Cl.
*G06F 15/173* (2006.01)
*H04L 12/24* (2006.01)

(52) U.S. Cl.
CPC .................. *H04L 41/0816* (2013.01)

(58) Field of Classification Search
CPC .................. G06F 9/5083; H04L 41/0816
USPC ........................................ 709/227
See application file for complete search history.

(56) References Cited

U.S. PATENT DOCUMENTS

| | | | |
|---|---|---|---|
| 2002/0116357 A1* | 8/2002 | Paulley | G06F 17/30466 |
| 2004/0107245 A1* | 6/2004 | Bodnar | G06F 17/30905 709/203 |
| 2006/0075113 A1* | 4/2006 | Black | H04L 41/12 709/227 |

* cited by examiner

*Primary Examiner* — Phuoc Nguyen
(74) *Attorney, Agent, or Firm* — Baker & Hostetler LLP

(57) ABSTRACT

A system may be configured to provide a service for performing various actions on behalf of clients. The clients may be associated with diverse properties such as location, language, and legal jurisdiction. A service may be adapted to respond to a diversified client base. Properties of the client may be identified. A client capability enumeration may be loaded and used to identify transformation operations that may be performed on requests to the service and replies to the client. Transformation operations may be applied in a transmutation pipeline that modifies the input to and the results of an action.

21 Claims, 7 Drawing Sheets

REQUEST RESPONSE TRANSMUTATION PIPELINE

BACKGROUND

Hosted computing services may perform a wide variety of actions on behalf of various clients. The services may be provided to not only a high number of clients, but also a wide diversity of client types. There may, for example, be a number of client versions, each version having its own expectations regarding protocols for interfacing with the hosted computing service. In addition, clients may be located in different geographic regions, each of which may have various requirements regarding localization, such as language, currency type, dates and so on. In some cases, various pieces of localization information must be provided to clients operating within a certain geographic region. There might also be certain clients for whom special categories of information should be displayed. Many permutations of the previous factors may occur. Accordingly, providing support for a diversified client base may be complex.

BRIEF DESCRIPTION OF DRAWINGS

The following detailed description may be better understood when read in conjunction with the appended drawings. For the purposes of illustration, various examples of aspects of the disclosure are shown in the drawings; however, embodiments are not limited to the specific methods and instrumentalities disclosed.

DETAILED DESCRIPTION

A hosted computing service may comprise one or more computing nodes configured to perform various services, which may be referred to as actions, on behalf of various clients. Various non-limiting examples of a hosted computing service are web services, web sites, hosted business objects and so forth. Various clients may communicate with a hosted service over a network, using a protocol such as hypertext transfer protocol ("HTTP") and data formats such as binary, extensible markup language ("XML"), and/or hypertext markup language ("HTML"). Requests to perform an action may be sent by the client to be received by a process associated with the service. The request may include data, which may be referred to as parameters, for use in performing the action. After processing the request, the service may send a response to the client.

A diversified client base may utilize a hosted computing service. Diversity in clients utilizing a service may originate from many different factors. Various clients may have different expectations regarding the version of a service that they are contacting. As new versions of a hosted service replace older versions, there may be a proliferation of older clients written to utilize the older versions of the service. Another factor which may contribute to a diversified client base is localization. Based on local custom, a client may expect for certain data, such as dates, numbers or currency, to be delivered in a particular format. Localization may also comprise steps taken to display information in an appropriate language, based on factors such as the location of the client or on information specified by the client and transmitted. Yet another factor is that the service provider may have a legal obligation to provide certain information to a client, based on the client's location, or more general the client's legal jurisdiction or other factors.

Figure 1:
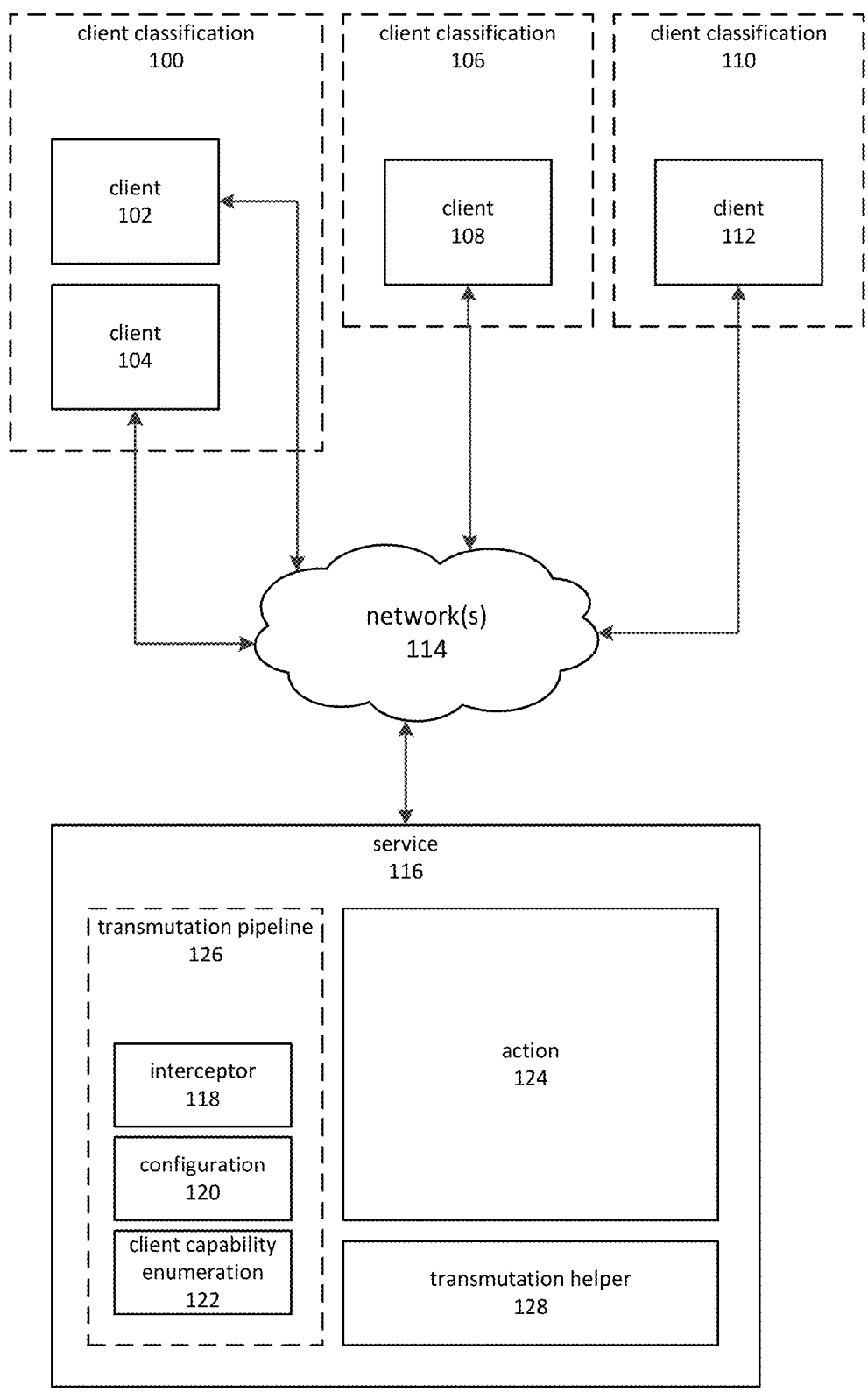
FIG. 1 is a block diagram depicting an illustrative example of a diversified client base and an extensible adaptation mechanism.

As presented herein, extensible adaptation techniques may be employed to adapt a service to a diversified client base. FIG. 1 is a block diagram depicting an illustrative example of a diversified client base and an extensible adaptation mechanism. Among a number of clients 102, 104, 108 and 112, there may exist a number of possible client classifications 100, 106 and 110. Classifications may be based, for example, on factors such as client version number, location, regulatory requirements and so on. Embodiments might employ various other properties related to the client.

One of various clients 102, 104, 108 and 112 may issue requests communicated over network(s) 114 to service 116 to perform an action 124 on its behalf. As used herein, the term service may include computing nodes configured to process requests received from the client, in order to perform the requested action. The term action may refer to a subset of functionality provided by service 116. For example, an action could include an application programming interface ("API") method. A request may comprise information such as an identifier of the action to be performed, parameters to supply to an API for performing the action and so on. In addition to containing computing nodes for performing requested actions, service 116 may contain computing nodes (which may or may not be the same computing nodes) for performing various operations related to adapting to a diversified client base. For example, one or more computing nodes may be configured to operate transmutation pipeline 126.

A transmutation pipeline 126 may comprise various elements such as servers, executable programs, modules, libraries and so forth for performing aspects of adapting to a diversified client base. This may include interceptor 118, configuration 120 and client capability enumeration 122.

An interceptor 118 may intercept or otherwise receive requests to perform action 124 on behalf of a client. A client might, for example, send requests directly to interceptor 118 or some mechanism might be employed to redirect requests sent to another destination. In various embodiments, interceptor 118 may perform coordination of various operations performed for adapting to a diversified client base. In various embodiments, interceptor 118 may track references to incoming requests, which may include information such as the client originating the request, and an identifier or pointer to the action to be performed. Embodiments may store information indicative of the request to perform an action. After performing various adaptation operations, interceptor 118 might coordinate return of adapted results to the requesting clients, for example by retrieving the information indicative of the request to perform the action.

A dynamic configuration element 120 may include a map comprising associations between various actions, such as action 124, that may be performed by service 116 and a set of transformation operations potentially applicable to an action being performed. In various embodiments, a map may consist of a configuration file containing entries associating action 124 of service 116 with client capability enumeration 122. More generally, dynamic configuration 120 may contain information associating actions, categories of actions and so forth with a variety of transformation operations that may be applied, in various combinations, to clients of different classifications.

A client capability enumeration 122 may include a mechanism for mapping from information indicative of the client to a set of transformation operations. Embodiments may employ a module containing an enumeration class or other object type. There may exist in some embodiments a one-to-one relationship between an identifier indicative of an action 124 and a client capability enumeration 122. A client capability enumeration 122 may comprise an enumeration class or other programming construct. In various embodiments, client capability enumeration 122 may be contained within a module. As used herein, the term module may refer to dynamic and statically linked software libraries, executable programs, operating system code, circuitry and so forth, including various combinations of the preceding. The module may contain instructions for mapping from one or more properties of a client to one or more transformation operations that may be performed on a request or response to which a transmutation pipeline is being applied. A client capability enumeration may be described as a mapping between properties of a client and a set of transformation operations. The client capability enumeration may, for example, comprise a set of information indicative of transformation operations applicable to various client configurations.

An enumeration or other form of map such as client capability enumeration 122 may comprise information indicative of the capabilities and requirements pertaining to various potential clients. For example, client capability enumeration 122 might comprise entries listing various client versions and associated information that is indicative of transformations to be applied to input parameters to an action or to the results of performing an action. Embodiments may perform a standardization process on information describing clients, such as information pertaining to client capabilities and requirements, to a standardized format that may be used to locate a subset of transformation operations to apply.

Mapping available by or through client capability enumeration 122 may include determining which transformation operations may be performed on the request to perform an action prior to invoking the action, and which transformation operations may be applied to the result of performing the action in order to form a reply which may be returned to the client. For example, an embodiment might determine to apply a transformation to a request, prior to invoking an action, based on the version number of the client making the request. Embodiments may provide mappings in which one or more pieces of client information, such as version or location, are related to one or more transformation operations. In various cases and embodiments, some transformation operations may be for transforming input for performing the action, such as parameters. In other cases and embodiments, other transformations may be for transforming a result of performing the action.

As an example, in some cases the client might be an older client which is unaware of new parameters needed to perform an action. When the client requests that the action be performed on its behalf, interceptor 118 may receive the request, either initially or by redirection. Embodiments may then utilize dynamic configuration 120 to identify and load client capability enumeration 122, which may contain a set of transformation operations indexed by various pieces of information pertaining to the client, such as version and location. Based on this information, embodiments may identify and load transmutation helper 128. The embodiment may then invoke a procedure contained in transmutation helper 128 in order to perform a transformation operation on the request, prior to invoking action 124. In this example, client capability enumeration 122 might contain an association between the old client version and a particular transmutation helper 128. Invocation of a procedure implemented within transmutation helper 128 may then result in a default value for the new parameter being inserted into the request. Embodiments may then cause the action to be performed using the information contained in the modified request.

Figure 2:
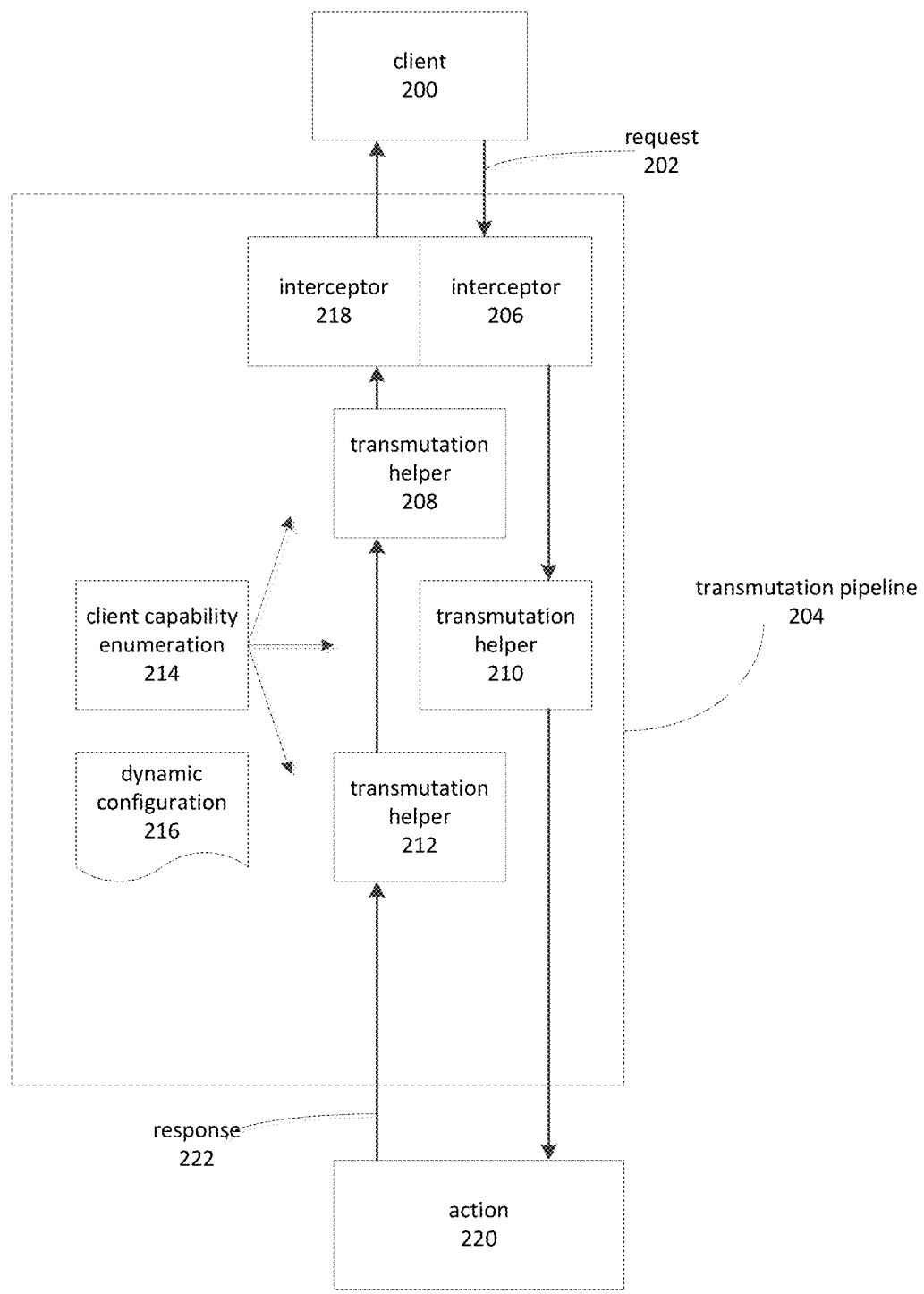
FIG. 2 is a block diagram depicting an additional example of a transmutation pipeline for adapting to a diversified client base.

FIG. 2 is a block diagram depicting an additional example of a transmutation pipeline for adapting to a diversified client base. A client 200 may issue a request 202 to have some action 220 performed on its behalf. Interceptor 206 may initially receive the request. Elements of transmutation pipeline 204 may utilize dynamic configuration 216 to locate a client capability enumeration 214 corresponding to action 220. A dynamic configuration 216 may comprise various forms of configuration files such as XML files, or binary files. Embodiments may utilize a format for dynamic configuration 216 that may be updated without recompiling code elements associated with transmutation pipeline 204.

In FIG. 2, client capability enumeration 214 is depicted as causing procedures defined within transmutation helpers 208, 210 and 212 to be invoked during processing of request 202. For example, FIG. 2 depicts a transformation operation performed on request 202 by a procedure of transmutation helper 210 prior to action 220 being invoked. Once action 220 has been performed, embodiments may invoke procedures defined in transmutation helpers 212 and 208 to form a final version of the reply. The transmutation helpers 212 may be applied in series to response 222 of performing action 220. For example, transmutation helper 212 might insert a legal notice that is required based on the client's location, while transmutation helper 208 might perform localization operations. Once the final version of the reply has been formed, interceptor 218 (which may coincide with or otherwise be integral to interceptor 206) may cause the reply to be returned to client 200.

Figure 3:
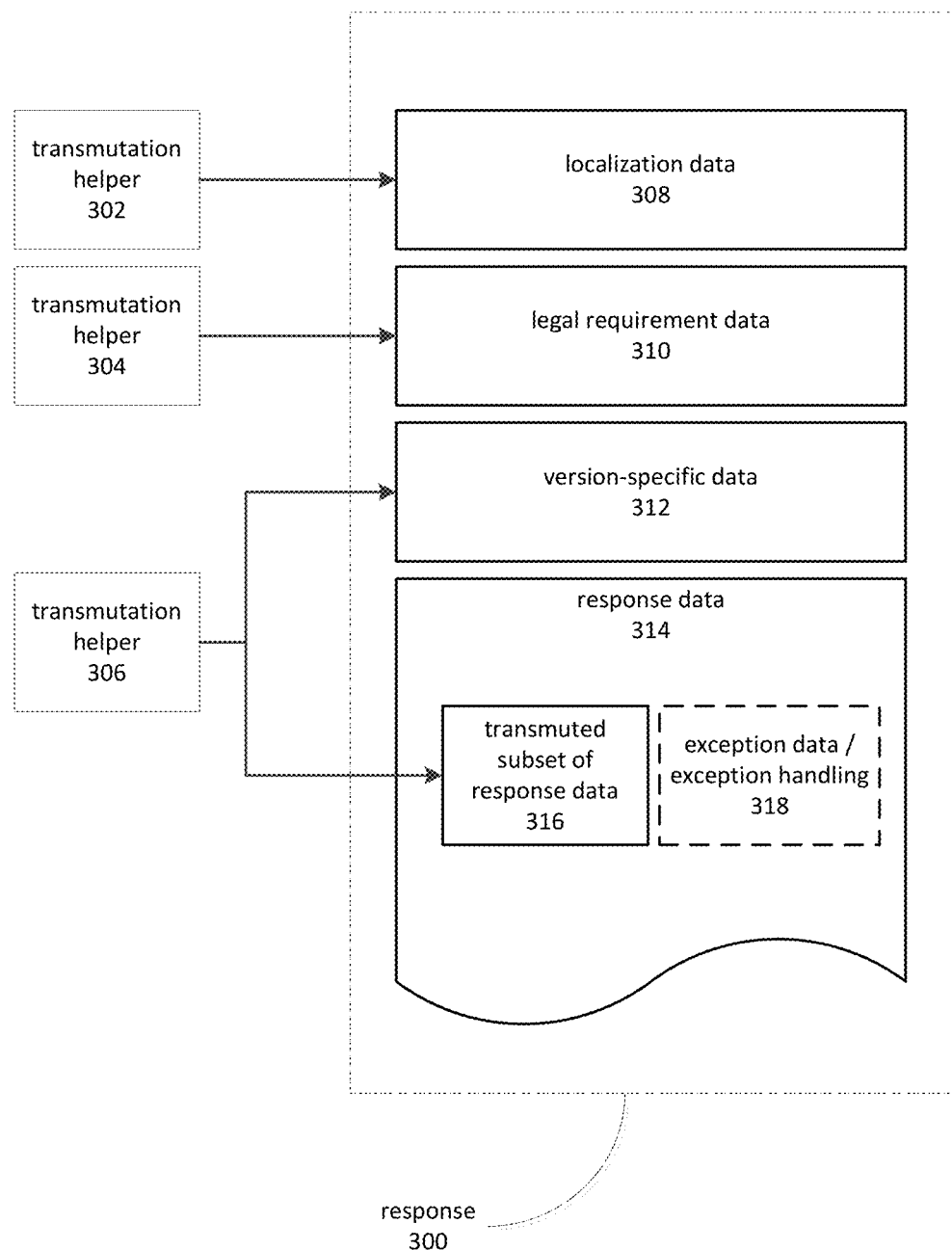
FIG. 3 depicts an example of a response modified using a series of transmutation helpers.

FIG. 3 depicts an example of a response modified using a series of transmutation helpers. Note that although the depicted example involves a modified response 300, it will be appreciated that embodiments may modify requests in a similar fashion. Modifying requests may comprise alterations are additions to parameters used by a service in performing an action requested by a client. In various embodiments, requests and/or replies may be represented in various forms such as XML or HTML, for example. In some embodiments, request and/or reply information may be included in header information, such as HTTP header information.

As illustrated in FIG. 3, a response 300 to performing an action on behalf of a client may be modified by a series of transmutation helpers. Application of the series may proceed in a pipeline, so that the output of modifying response 300 in a first stage is available as input to the next stage of modification. For example, in FIG. 3 response data 314 may be initially modified by transmutation helper 306, which may transmute a subset of response data 316. Transmutation helper 306 may also insert or append version-specific data 312 to response 300. Version-specific data could, in various cases and embodiments, include adding missing values, removing disallowed parameters, or modifying the type and/or range of values.

Embodiments may also modify exception data and/or exception handling 318. This may include replacing exception data with alternative data, altering data in the response affected by an exception and so on. For example, data corresponding to an exception type known to a later client version might be replaced with data corresponding to an exception type known to an earlier client version. As used herein, the term "exception" may refer to various error events and conditions, and the term "exception data" may refer to data describing an error event or condition. The term "exception handling" may refer to performing additional steps, such as transformation operations, to correct or compensate for an error condition.

Additional information may be added to the response by transmutation helper 304, which may add legal requirement data 310 to the response. For example, an embodiment might determine to utilize a transformation operation in transmutation helper 304 based at least in part on a mapping in a client capability enumeration from the client's location to the transmutation helper. A procedure defined in the transmutation helper may manipulate response data 314—which at this point may include a transmuted subset of response data 316 and version-specific data 312—to also contain legal requirement data 310. An example of legal requirement data includes a notice required by the local law applicable in the client's location.

Data localization may be performed by transmutation helper 302, which may perform transformation operations such as inserting localization data 308 such as localized string resources. A transmutation helper 302 may also modify existing data elsewhere in the request, for example by changing date references to use a local format, changing character encoding, replacing text in one language with text in another and so on.

In some cases and embodiments, transmutation helpers may be employed to take alternate execution paths to form a response. This may be done in lieu of modifying data in a response or adding data to a response. Alternate execution paths may, in some cases, take output from previous transmutation helpers as input parameters.

It will be appreciated that the various examples of request or reply modification suggested herein are among many possible modifications that may be performed on request and reply data using techniques consistent with the present disclosure. For example, in some embodiments a transformation helper may be used as a means of normalizing and sanitizing request data for security purposes. Another example is that a transformation helper may be injected into the transmutation pipeline in order to add or remove log data for diagnostic purposes. In another embodiment, requests may be modified to enforce parental controls or other forms of limiting or modifying available functionality.

Figure 4:
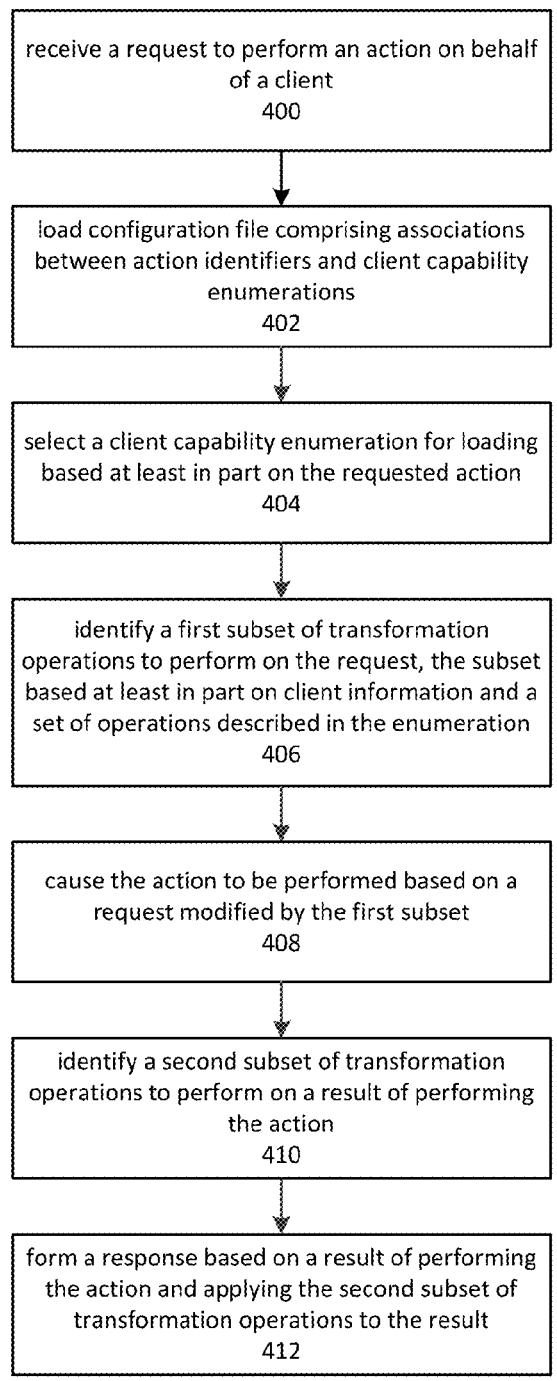
FIG. 4 depicts an example of a process for adapting to a diversified client base by applying request and response transformations.

FIG. 4 depicts an example of a process for adapting to a diversified client base by applying request and response transformations. Although FIG. 4 is depicted as a sequence of operations, those of ordinary skill in the art will appreciate that the depicted order should not be construed as limiting the scope of the present disclosure and that at least some of the depicted operations may be altered, omitted, reordered or performed in parallel.

Embodiments may receive a request to perform an action on behalf of a client, as depicted by operation 400. An interceptor component may initially receive the request from the client over a network, or the request may be redirected or rerouted to an interceptor component. In various embodiments, the interceptor component may retain context information for the received request during application of a transmutation pipeline, and thereafter retrieving the context information in order to transmit the transmuted response to the client who originated the request to perform an action.

Operation 402 depicts loading a configuration file comprising associations between actions and one or more client capability enumerations pertaining to the action. The configuration file may, in some embodiments, be an XML file or other file that can be easily modified without forcing a recompilation of program code. An action identifier, such as a string value naming the action, may be used as a key in the configuration file. The key value may be associated with a path, globally-unique identifier or other information directly or indirectly identifying a client capability enumeration.

Embodiments may employ the configuration file to select a client capability enumeration to load, as depicted by operation 404. A client capability enumeration may comprise data or procedures for mapping from one or more pieces of information to a module containing a transformation operation. In various cases and embodiments, the information may comprise client version information, client identity and client location information. Location information may comprise information such as country, region, zip code, state and so on. Mapping provided by a client capability enumeration may, in some cases and embodiments, be a mapping from one set of information (which may contain multiple pieces of information) to many modules containing transformation operations, or to fewer or one module containing a number of transformation operations.

At operation 406, a first subset of transformation operations may be identified based at least partly on using the client capability enumeration. The first subset of transformation operations may be applied to the request prior to performing the action on behalf of the client, so that the request contains parameters or other information modified to include required information, present information in the format expected by the service performing the action and so on. The action may then be performed as depicted by operation 408 and a result obtained. In some cases, the first subset may be empty.

Embodiments may perform a standardization procedure to form canonical representations of client information, which may also be referred to as standardized representations. A standardized representation of client information may be used to locate subsets of transformation operations in a client capability enumeration.

At operation 410, embodiments may identify a second subset of transformation operations. The second subset of operations may then be performed, as depicted by operation 412, on the result obtained from performing the action. The modified result may then be used to form a response to the client. In some cases, the second subset may be empty, in which case the result is not modified.

Figure 5:
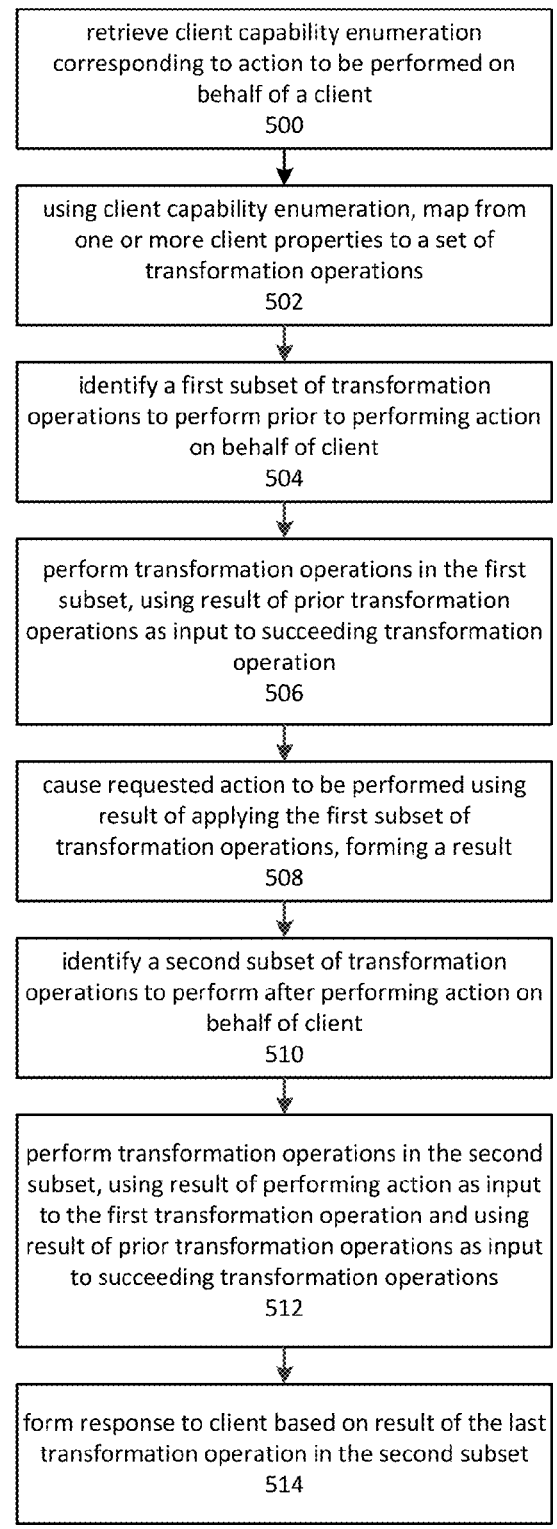
FIG. 5 depicts an embodiment of a process for using a transmutation pipeline that applies a first series of transformation operations to input for performing an action on behalf of a client and a second series of transformation operations to the output of performing the action.

In various cases and embodiments, either the first subset or the second subset of operations may be empty. In other cases and embodiments, the result of applying a first set of transformation operations may be used as input to applying a second set of transformation operations. FIG. 5 depicts an embodiment of a process for using a transmutation pipeline that applies a first series of transformation operations to input for performing an action on behalf of a client and a second series of transformation operations to the output of performing the action. Although depicted as a sequence of operations, those of ordinary skill in the art will appreciate that the depicted order should not be construed as limiting the scope of the present disclosure and that at least some of the depicted operations may be altered, omitted, reordered or performed in parallel.

As depicted by operation 500, a client capability enumeration may be retrieved based on a correspondence between an action to be performed on behalf of a client and the client capability enumeration. Embodiments may utilize a configuration file or various other structures. In some cases and embodiments, a configuration file may specify that an action corresponds to more than one client capability enumeration. Embodiments may, for example, obtain a subset of transformation operations from each client capability enumeration and combine them into a unified set. The configuration file may specify or imply ordering information for combining the operation. For example, the order in which client capability enumerations are listed in a configuration file might influence the order of operations in the combined set. In order to provide a concise explanation of a transmutation pipeline, FIG. 5 is generally described in terms of a single client capability enumeration. However, the depicted operations may, where applicable, be adapted for use with multiple client capability enumerations.

Operation 502 depicts using a client capability enumeration to map from one or more client properties to a set of transformation operations. In some cases and embodiments, there may be no need to enforce an order for applying transformation operations to the input and output of an action. However, in other cases embodiments may specify or imply an order. Order information may include an order for transformation operations performed on input to performing an action, on operations performed on the result of performing the action, and also to specify which operations should be performed on the input and which operations should be performed on the output. In some embodiments, performing the action may itself be treated as a transformation operation, whose order is specified or implied relative to other transformation operations.

At operation 504, a first subset of transformation operations may be identified. The first subset may correspond to those transformation operations performed on input to performing the action. Ordering of the transformation operations may be applied by sequentially performing the transformation operations in the first subset, using the result of applying a previous transformation operation as input to the succeeding transformation operation. This is depicted in FIG. 5 by operation 506.

Operation 508 depicts causing the action to be performed, using the output from applying the first subset of transformation operations. As noted, some embodiments may treat performing the action as another stage in the transmutation pipeline. Output from performing the action may be saved as an intermediate result, to which a second subset of transformation operations may be applied. Operation 510 depicts identifying a second subset of operations to be performed on the output of performing the action. At operation 512, the transformation operations in the second subset may be applied, using the result of prior transformation operations as input to succeeding transformation operations. At operation 514, output from the final transformation operation in the second subset may be used as the basis of forming a response to the client that requested the action to be performed on its behalf.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates and administration. Some DBMSs provide for interaction with the database using query languages, such as structured query language ("SQL"), while others use APIs containing operations, such as put and get, and so forth. Interaction with the database may also be based on various protocols or standards, such as HTML and XML. A DBMS may comprise various architectural components, such as a storage engine that acts to store data on one or more storage devices such as solid-state drives.

Figure 6:
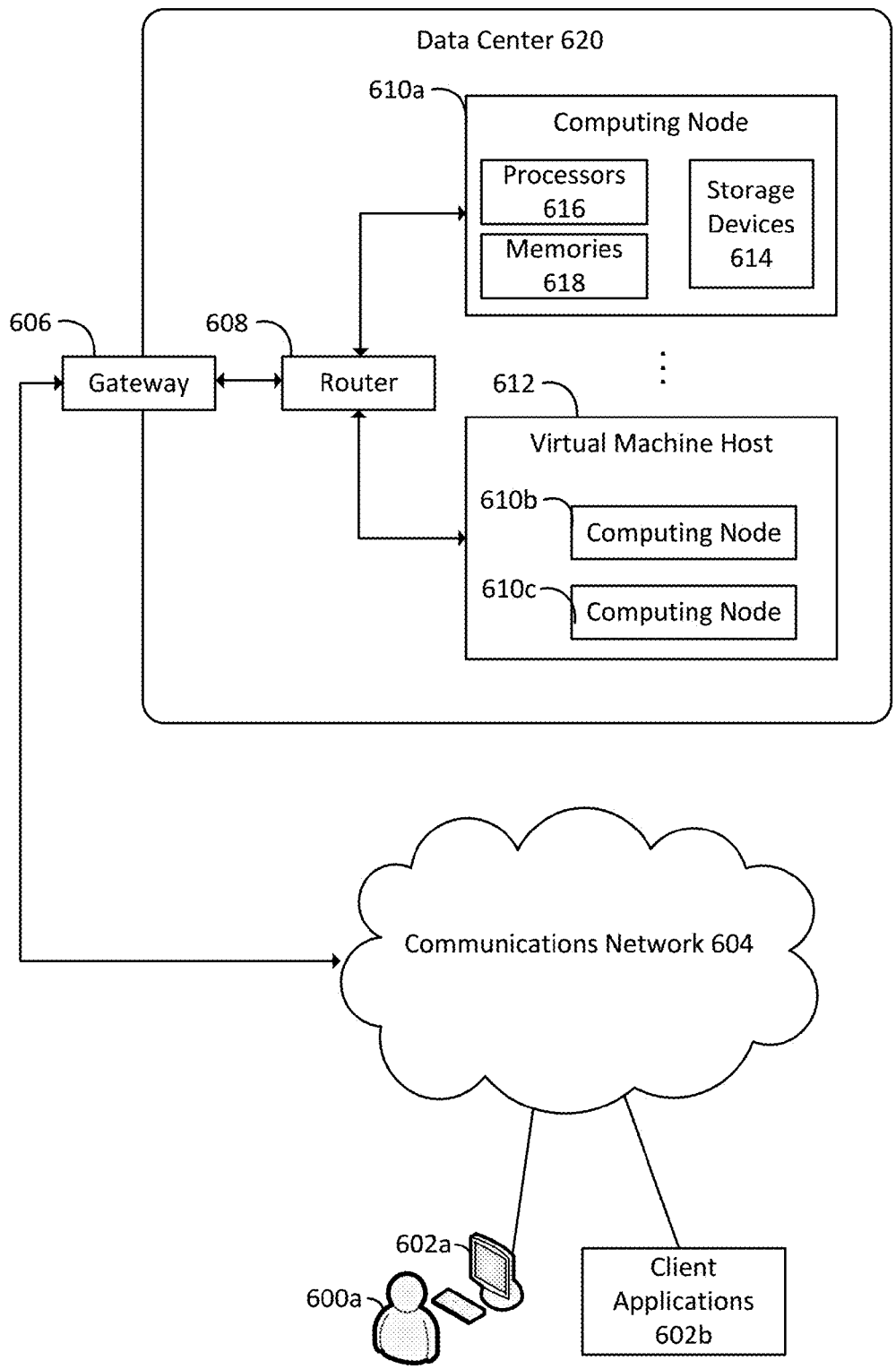
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600a may interact with various client applications, operating on any type of computing device 602a, to communicate over communications network 604 with processes executing on various computing nodes 610a, 610b and 610c within a data center 620. Alternatively, client applications 602b may communicate without user intervention. Communications network 604 may comprise any combination of communications technology, including the Internet, wired and wireless local area networks, fiber optic networks, satellite communications and so forth. Any number of networking protocols may be employed.

Communication with processes executing on the computing nodes 610a, 610b and 610c, operating within data center 620, may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610a, 610b and 610c. Some of these intermediate layers may themselves comprise processes executing on one or more of the computing nodes. Computing nodes 610a, 610b and 610c, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610a is depicted as residing on physical hardware comprising one or more processors 616, one or more memories 618 and one or more storage devices 614. Processes on computing node 610a may execute in conjunction with an operating system or alternatively may execute as a bare-metal process that directly interacts with physical resources, such as processors 616, memories 618 or storage devices 614.

Computing nodes 610b and 610c are depicted as operating on virtual machine host 612, which may provide shared access to various physical resources such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities and so forth. A computing node may refer to various types of computing resources, such as personal computers, servers, clustered computing devices and so forth. A computing node may, for example, refer to various computing devices, such as cell phones, smartphones, tables, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
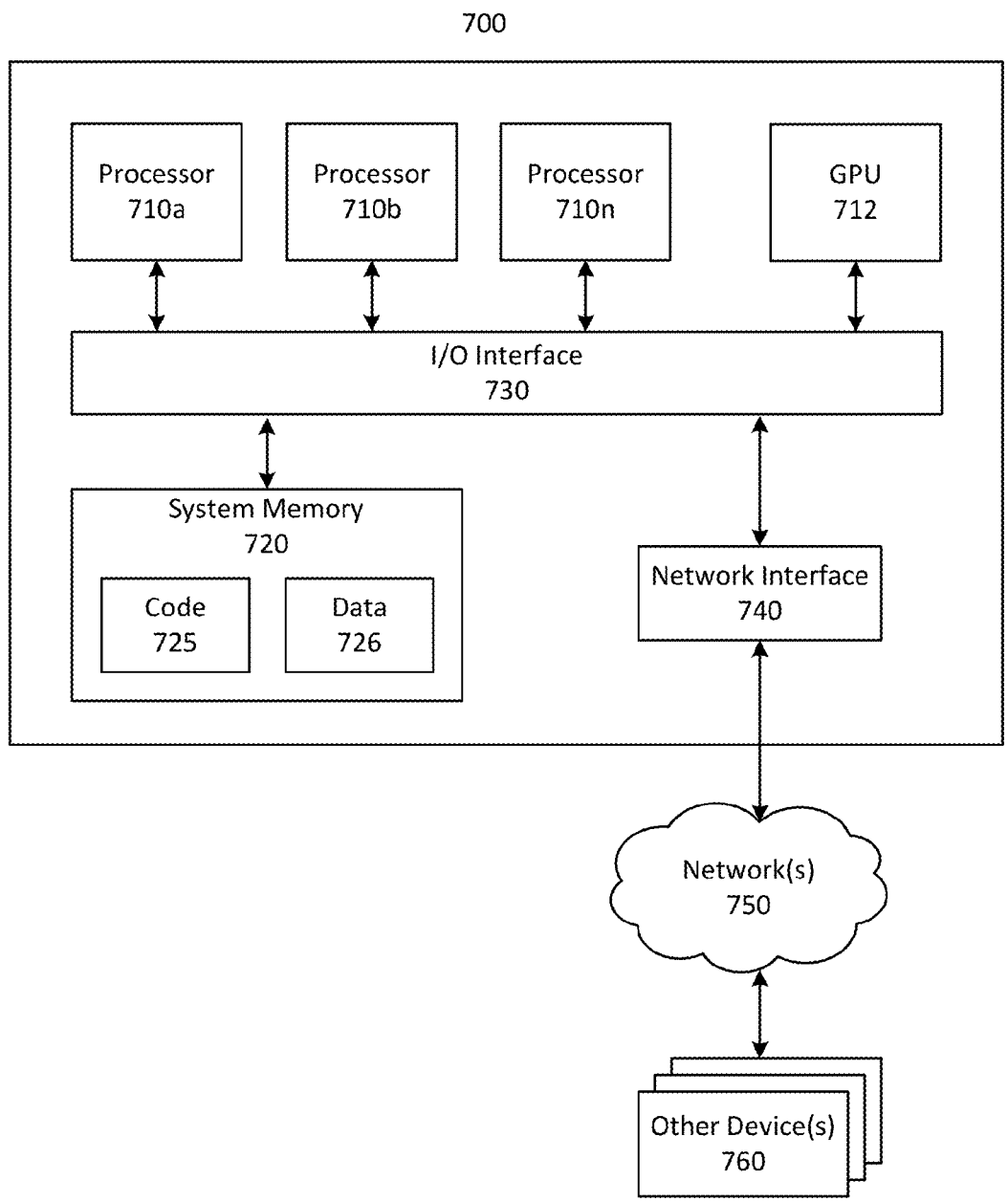
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 910 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
    a first one or more computing nodes configured to operate a service configured to perform an action on behalf of a client;
    a second one or more computing nodes configured at least to:
        receive a request to perform the action on behalf of the client;
        determine to load an enumeration comprising information indicative of capabilities or requirements of the client with respect to the action, the loading based at least in part on a configuration file comprising an association between the action to be performed and the enumeration;
        identify a first module comprising a first procedure for performing a first transformation operation, the first module identified based at least in part on the enumeration and one or more properties of the client, the properties comprising at least one of client version, geographic location, localization, or legal jurisdiction;
        identify a second module comprising a second procedure for performing a second transformation operation, the second module identified based at least in part on the enumeration and at least one of the one or more properties of the client;
        cause the action to be performed by the first one or more computing nodes, wherein the action is performed based at least in part on invoking the first procedure to apply the first transformation operation to the request; and
        form a response to the request, wherein the response is formed based at least in part on invoking the second procedure to apply the second transformation operation to a result of performing the action.

2. The system of claim 1, the second one or more computing nodes further configured to at least:
    form the response to the request based at least in part on applying a third transformation operation to a result of performing the second transformation operation.

3. The system of claim 1, wherein the enumeration comprises instructions for identifying the first module, the identifying based at least in part on the one or more properties of the client, the second one or more computing nodes further configured at least to:
    perform the instructions for identifying the first module.

4. The system of claim 1, the second one or more computing nodes further configured at least to:
    identify the first module based at least in part on forming a standardized representation of the at least one of the one or more properties of the client.

5. A method comprising:
    receiving a request to perform an action on behalf of a client, the request comprising information indicative of the client;

identify a set of transformation operations, the identifying based at least in part on a map comprising an association between the action to be performed and the set of transformation operations;

forming a standardized representation of the information indicative of the client;

identifying a first subset of zero or more transformation operations of the set of transformation operations, based at least in part on the transformation operations in the first subset being associated with the standardized representation of the information indicative of the client;

identifying a second subset of zero or more transformation operations of the set of transformation operations, based at least in part on the transformation operations in the second subset being associated with the standardized representation of the information indicative of the client;

causing the action to be performed on behalf of the client, the action performed based at least in part on applying the first subset of the set of transformation operations to the request when the first subset comprises at least one transformation operation; and forming a reply to the request, the forming based at least in part on applying the second subset of the set of transformation operations to a result of performing the action when the second subset comprises at least one transformation operation.

6. The method of claim 5, wherein the information indicative of the client comprises at least one of version, geographic location, localization, or legal jurisdiction.

7. The method of claim 5, further comprising:
loading a first module containing an enumeration of the set of transformation operations, each element of the enumeration comprising a reference to a procedure for identifying the first subset of the set of transformation operations.

8. The method of claim 7, further comprising:
identifying the first subset of the set of transformation operations based at least in part on invoking the procedure for identifying the first subset.

9. The method of claim 5, wherein a transformation operation of the first subset of the set of transformation operations comprises at least one of adding data, removing data, modifying a data format, handling an error condition, or performing an additional action.

10. The method of claim 5, wherein a transformation operation of the second subset of the set of transformation operations comprises adding a legally required notice to the reply.

11. The method of claim 5, wherein a transformation operation of the second subset of the set of transformation operations comprises modifying at least one of a date format, a currency format, a number format, or a displayed language.

12. The method of claim 5, further comprising:
applying output of a first transformation operation of the first subset to input to a second transformation operation of the first subset.

13. The method of claim 5, wherein a configuration file comprises the map.

14. A non-transitory computer-readable storage medium having stored thereon instructions that, upon execution by one or more computing devices, cause the one or more computing devices at least to:
load information indicative of a set of transformation operations, the loading based at least in part on a file comprising an association between an action and the information indicative of a set of transformation operations, the action corresponding to a request to perform the action on behalf of a client;

identify a first module comprising a first procedure for performing a first transformation operation of the set of transformation operations, the first module identified based at least in part on the information indicative of a set of transformation operations and at least one property of the client;

identify a second module comprising a second procedure for performing a second transformation operation of the set of transformation operations, the second module identified based at least in part on the information indicative of a set of transformation operations and at least one property of the client;

cause the action to be performed, wherein the action is performed based at least in part on invoking the first procedure to apply the first transformation operation to the request; and form a response to the request, wherein the response is formed based at least in part on invoking the second procedure to apply the second transformation operation to a result of performing the action.

15. The non-transitory computer-readable medium of claim 14, comprising further instructions that, upon execution by the computing device, cause the computing device to at least:
form the response to the request based at least in part on applying a third transformation operation to a result of performing the second transformation operation.

16. The non-transitory computer-readable medium of claim 14, comprising further instructions that, upon execution by the computing device, cause the computing device to at least:
identify the first module based at least in part on performing instructions for identifying the first module contained in the information indicative of a set of transformation operations.

17. The non-transitory computer-readable medium of claim 14, wherein the at least one property of the client comprises at least one of version, geographic location, localization, or legal jurisdiction.

18. The non-transitory computer-readable medium of claim 14, wherein a transformation operation comprises adding data, modifying data, replacing data, removing data, handling an error condition, or performing an additional action.

19. The non-transitory computer-readable medium of claim 14, wherein a transformation operation comprises modifying at least one of a date format, a currency format, a number format, legal information, or a displayed language.

20. The non-transitory computer-readable medium of claim 14, comprising further instructions that, upon execution by the computing device, cause the computing device to at least:
load the information indicative of a set of transformation operations based at least in part on path information associated with the action in the file.

21. The non-transitory computer-readable medium of claim 14, comprising further instructions that, upon execution by the computing device, cause the computing device to at least:
cause the action to be performed by executing a third transformation operation of the set of transformation operations.

* * * * *